(12) United States Patent
Douma (10) Patent No.: US 8,038,054 B2
(45) Date of Patent: Oct. 18, 2011

(54) METHOD OF USING AN INDICIA READER (75) Inventor: Jan R. Douma, Oosterhout (NL)

(73) Assignee: Hand Held Products, Inc., Skaneateles Falls, NY (US)

( * ) Notice: Subject to any disclaimer, the term of this patent is extended or adjusted under 35 U.S.C. 154(b) by 338 days.

(21) Appl. No.: 11/586,481

(22) Filed: Oct. 25, 2006

(65) Prior Publication Data

US 2008/0099561 A1 May 1, 2008

(51) Int. Cl.
*G06F 17/00* (2006.01)
*G06K 19/06* (2006.01)
*G06K 7/14* (2006.01)
*G06Q 30/00* (2006.01)

(52) U.S. Cl. ........ 235/375; 235/454; 235/494; 705/26.1

(58) Field of Classification Search .................. 235/494, 235/462.01, 462.1, 454, 375; 705/26.1
See application file for complete search history.

(56) References Cited

U.S. PATENT DOCUMENTS

| | | | | |
|---|---|---|---|---|
| 5,412,194 A * | 5/1995 | Melbye et al. | ................ | 235/437 |
| 5,797,098 A * | 8/1998 | Schroeder et al. | ............ | 455/464 |
| 6,997,384 B2 * | 2/2006 | Hara | ............................. | 235/454 |
| 7,044,362 B2 * | 5/2006 | Yu | ................................ | 235/375 |
| 7,314,167 B1 * | 1/2008 | Kiliccote | ...................... | 235/380 |
| 7,520,427 B2 * | 4/2009 | Boyd | ........................... | 235/382 |
| 2002/0023027 A1 * | 2/2002 | Simonds | ........................ | 705/26 |
| 2002/0023053 A1 * | 2/2002 | Szoc et al. | ...................... | 705/39 |
| 2002/0054064 A1 * | 5/2002 | Argabright et al. | ........... | 345/716 |
| 2002/0112015 A1 * | 8/2002 | Haynes | ........................ | 709/206 |
| 2003/0069844 A1 * | 4/2003 | Koren | ............................ | 705/40 |
| 2003/0163384 A1 * | 8/2003 | Hendra | ........................ | 705/26 |
| 2003/0182238 A1 * | 9/2003 | Brookner et al. | .............. | 705/62 |
| 2003/0230630 A1 * | 12/2003 | Whipple et al. | ......... | 235/462.01 |
| 2004/0039635 A1 * | 2/2004 | Linde et al. | ..................... | 705/14 |
| 2004/0104901 A1 * | 6/2004 | Capurso et al. | ............... | 345/204 |
| 2004/0118923 A1 * | 6/2004 | Creamer et al. | ......... | 235/462.01 |
| 2005/0091111 A1 * | 4/2005 | Green et al. | .................... | 705/14 |
| 2006/0054695 A1 * | 3/2006 | Owada | ......................... | 235/440 |
| 2006/0196950 A1 * | 9/2006 | Kiliccote | ...................... | 235/494 |
| 2007/0005717 A1 * | 1/2007 | LeVasseur et al. | ............ | 709/206 |
| 2009/0001173 A1 * | 1/2009 | Sevier et al. | ............ | 235/462.41 |
| 2010/0138344 A1 * | 6/2010 | Wong et al. | ..................... | 705/44 |
| 2011/0000958 A1 * | 1/2011 | Herzig | .......................... | 235/375 |

FOREIGN PATENT DOCUMENTS

| | | |
|---|---|---|
| EP | 1480476 A1 * | 11/2004 |
| GB | 2420894 A * | 6/2006 |
| WO | WO 03091944 A1 * | 11/2003 |

* cited by examiner

*Primary Examiner* — Michael G Lee
*Assistant Examiner* — Suezu Ellis
(74) *Attorney, Agent, or Firm* — Hiscock & Barclay, LLP (57) ABSTRACT

A method of completing a transaction including the steps of: a customer remotely ordering a product from a provider; the provider sending an indicia to the customer, the indicia being representative of the product ordered; the provider sending authentication data to the customer for utilization as an authentication process at a point of transaction (POT); the customer displaying a new indicia at the POT; and the provider reading the new indicia at the POT.

9 Claims, 9 Drawing Sheets

METHOD OF USING AN INDICIA READER

FIELD OF THE INVENTION

The present invention relates to indicia reading devices, and more particularly to a method of using indicia reading system for reading indicia with transaction authorization.

BACKGROUND

Indicia reading devices (also referred to as scanners, readers, etc.) typically read data represented by printed indicia, (also referred to as symbols, symbology, bar codes, etc.) Indicia reading devices may be configured to read or obtain information from an information bearing device, such as a card having a magnetic strip, symbol indicia such as a bar code, an RFID instrument, biogenic information such as a fingerprint, etc.

One type of symbol indicia is an array of rectangular bars and spaces that are arranged in a specific way to represent elements of data in machine readable form. Indicia reading devices typically transmit light onto a symbol and receive light scattered and/or reflected back from a bar code symbol or indicia. The received light is interpreted by an image processor to extract the data represented by the symbol. Laser indicia reading devices typically utilize transmitted laser light.

One-dimensional (1D) optical bar code readers are characterized by reading data that is encoded along a single axis, in the widths of bars and spaces, so that such symbols can be read from a single scan along that axis, provided that the symbol is imaged with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, all or most all of which must be scanned and decoded, then linked together to form a complete message. Scanning still requires relatively higher resolution in one dimension only, but multiple linear scans are needed to read the whole symbol.

A class of bar code symbologies known as two dimensional (2D) matrix symbologies have been developed which offer orientation-free scanning and greater data densities and capacities than 1D symbologies. 2D matrix codes encode data as dark or light data elements within a regular polygonal matrix, accompanied by graphical finder, orientation and reference structures. Often times an optical reader may be portable and wireless in nature thereby providing added flexibility. In these circumstances, such readers form part of a wireless network in which data collected within the terminals is communicated to a host computer situated on a hardwired backbone via a wireless link. For example, the readers may include a radio or optical transceiver for communicating with a network computer.

Conventionally, a reader, whether portable or otherwise, may include a central processor which directly controls the operations of the various electrical components housed within the bar code reader. For example, the central processor controls detection of keyboard entries, display features, wireless communication functions, trigger detection, and bar code read and decode functionality.

Efforts regarding such systems have led to continuing developments to improve their versatility, practicality and efficiency.

DETAILED DESCRIPTION

Reference will now be made to exemplary embodiments of the invention which are illustrated in the accompanying drawings. This invention, however, may be embodied in various forms and should not be construed as limited to the embodiments set forth herein. Rather, these representative embodiments are described in detail so that this disclosure will be thorough and complete, and will fully convey the scope, structure, operation, functionality, and potential of applicability of the invention to those skilled in the art. Wherever possible, the same reference numbers will be used throughout the drawings to refer to the same or like parts. The term "scan" or "scanning" use herein refers to reading or extracting data from an information bearing indicia (or symbol).

An exemplary indicia reader system in accordance with the invention may be adapted for reading symbol indicia for numerous functions. A detailed description of transaction terminals and their operation is disclosed in commonly owned published United States Patent Application Publication No. 20030029917 entitled OPTICAL READER FOR IMAGING MODULE and United States Patent Application Publication No. 20030019934 entitled OPTICAL READER AIMING ASSEMBLY COMPRISING APERTURE, United States Patent Application Publication No. 20040134989 entitled DECODER BOARD FOR AN OPTICAL READER UTILIZING A PLURALITY OF IMAGING FORMATS which are hereby incorporated herein by reference.

Figure 1:
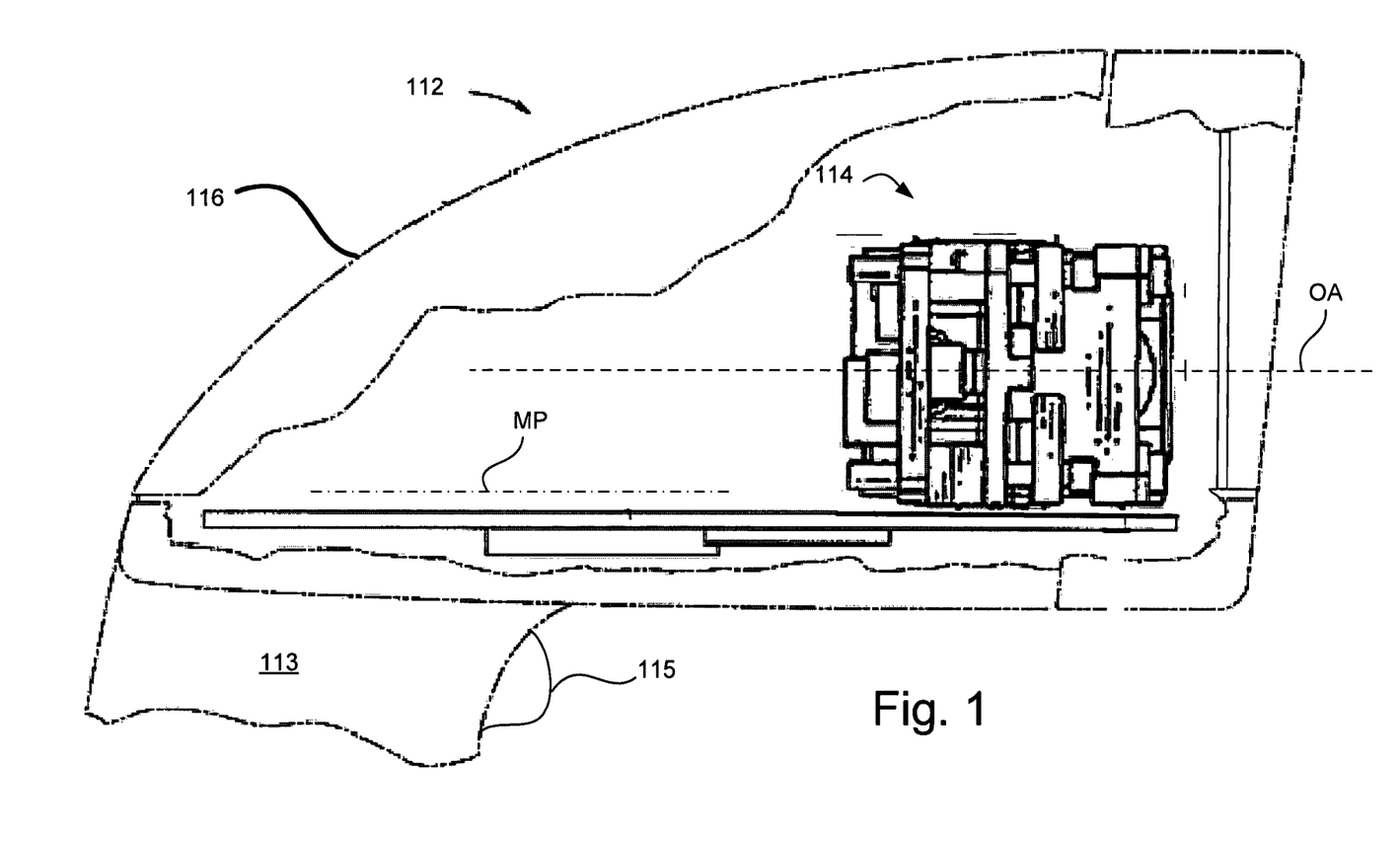
FIG. 1 is a fragmentary partially cutaway side view of an exemplary reader in accordance with the invention.
Figure 2:
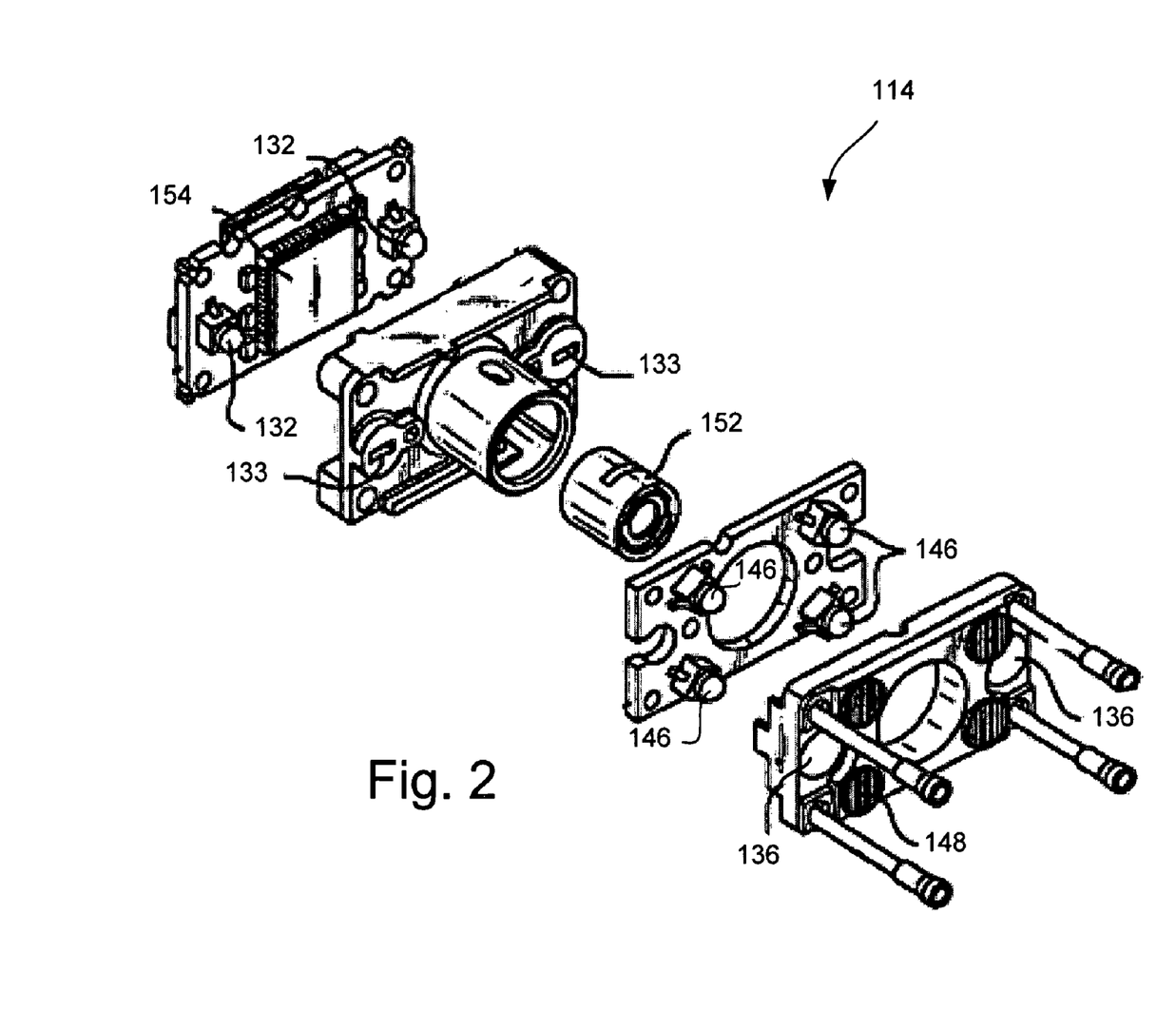
FIG. 2 is a perspective assembly view of an exemplary imaging module in accordance with the invention.
Figure 3:
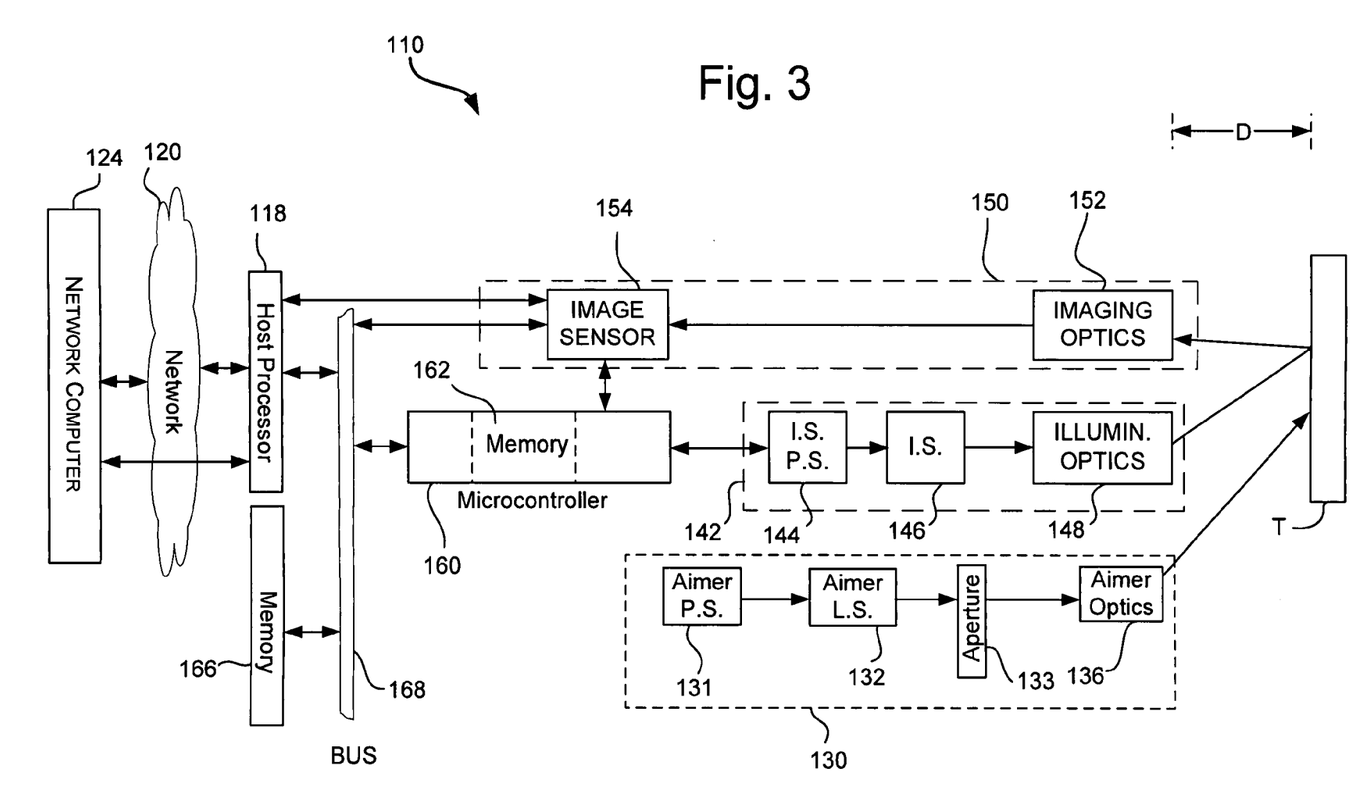
FIG. 3 is a block schematic diagram of an exemplary indicia reader in accordance with the invention.

Referring to FIGS. 1, 2 and 3, an exemplary indicia reader 112 which may have a number of subsystems for capturing and reading images, some of which may have symbol indicia provided therein. Reader 112 may have an imaging reader assembly 114 (including an image sensor 154) provided within a head portion or housing 116 which may be configured to be hand held by a handle portion 113. A trigger 115 may be used to control operation of the reader 112. The head portion 116 may have a medial plane MP selected so that when the hand-held imager is held with the head portion generally in a horizontal plane, the medial plane MP will generally be perpendicular to the face of the scanning head 116. Generally operators have a tendency to hold the medial plane of the head portion of the imager approximately normal to the plane of the target when collecting data. Image reader assembly 114 has imaging reader imaging optics having an optical axis (OA) for receiving light reflected off of a target T.

The optical axis is a line of symmetry through the imaging optics. The target may be any object or substrate which may bear a 1D or 2D bar code symbol or text or other machine readable information bearing indicia.

A trigger 115 may be used for controlling full or partial operation of the reader 112. Imaging reader assembly 114 may also have an aiming generator light source 132, aiming aperture 133, aiming optics 136, an illumination source 146, illumination optics 148 and imaging optics 152.

Illumination and aiming light sources with different colors may be employed. For example, in one such embodiment the image reader may include white and red LEDs, red and green LEDs, white, red, and green LEDs, or some other combination chosen in response to, for example, the color of the symbols most commonly imaged by the image reader. Different colored LEDs may be each alternatively pulsed at a level in accordance with an overall power budget.

An exemplary imaging system 110 may include a reader 112 in communication with a host processor 118. This host processor may be in communication with a network 120 which may be connected to one or more network computers 124. Reader 112 may include a number of components, such as an aiming pattern generator 130 adapted to generate an aiming pattern for assisting an operator to align target T coincident with the field of view of an imaging subassembly 150.

Aiming pattern generator 130 may include a power supply 131, light source 132, aperture 133 and optics 136 to create an aiming light pattern projected on or near the target which spans a portion of the receive optical system 150 operational field of view with the intent of assisting the operator to properly aim the scanner at the bar code pattern that is to be read. A number of representative generated aiming patterns are possible and not limited to any particular pattern or type of pattern, such as any combination of rectilinear, linear, circular, elliptical, etc. figures, whether continuous or discontinuous, i.e., defined by sets of discrete dots, dashes and the like.

Generally, the aiming light source(s) 132 may comprise any light source to provide a desired illumination pattern at the target and may be one or more LEDs 134, such as part number NSPG300A made by Nichia Corporation.

The light beam from the LEDs 132 may be directed towards an aperture 133 located in close proximity to the LEDs. An image of this back illuminated aperture 133 may then be projected out towards the target location with a lens 136. Lens 136 may be a spherically symmetric lens, an aspheric lens, a cylindrical lens or an anamorphic lens with two different radii of curvature on their orthogonal lens axis.

Alternately, the aimer pattern generator may be a laser pattern generator. The light sources 132 may also be comprised of one or more laser diodes such as those available from Rohm. In this case a laser collimation lens (not shown) will focus the laser light to a spot generally forward of the reader and approximately at the plane of the target T. This beam may then be imaged through a diffractive interference pattern generating element, such as a holographic element fabricated with a desired pattern. Examples of these types of elements may be available for example, from Digital Optics Corp. of Charlotte, N.C. among others. Elements of these types are described in U.S. Pat. No. 4,895,790 (Swanson); U.S. Pat. No. 5,170,269 (Lin et al) and U.S. Pat. No. 5,202,775 (Feldman et al), which are hereby incorporated herein by reference.

Image reader may include an illumination assembly 142 for illuminating target area T. Illumination assembly 142 may also include one or more power supplies 144, illumination sources 146 and illumination optics 148.

Image sensor 154 may be a two dimensional array of pixels adapted to operate in a global shutter or full frame operating mode which is a color or monochrome 2D CCD, CMOS, NMOS, PMOS, CID, CMD, etc. solid state image sensor. This sensor contains an array of light sensitive photodiodes (or pixels) that convert incident light energy into electric charge. Solid state image sensors allow regions of a full frame of image data to be addressed. An exemplary CMOS sensor is model number MT9V022 from Micron Technology Inc.

Further description of image sensors is provided in commonly owned U.S. patent application Ser. No. 11/077,995 entitled "BAR CODE READING DEVICE WITH GLOBAL ELECTRONIC SHUTTER CONTROL" filed on Mar. 11, 2005, which is hereby incorporated herein by reference in it's entirety.

In a full frame (or global) shutter operating mode, the entire imager is reset before integration to remove any residual signal in the photodiodes. The photodiodes (pixels) then accumulate charge for some period of time (exposure period), with the light collection starting and ending at about the same time for all pixels. At the end of the integration period (time during which light is collected), all charges are simultaneously transferred to light shielded areas of the sensor. The light shield prevents further accumulation of charge during the readout process. The signals are then shifted out of the light shielded areas of the sensor and read out.

Features and advantages associated with incorporating a color image sensor in an imaging device, and other control features which may be incorporated in a control circuit are discussed in greater detail in U.S. Pat. No. 6,832,725 entitled "An Optical Reader Having a Color Imager" incorporated herein by reference. It is to be noted that the image sensor 154 may read images with illumination from a source other than illumination source 146, such as from a source located remote from the reader.

The output of the image sensor may be processed utilizing one or more functions or algorithms to condition the signal appropriately for use in further processing downstream, including being digitized to provide a digitized image of target T.

Microcontroller 160, may perform a number of functions, such as controlling the amount of illumination provided by illumination source 146 by controlling the output power provided by illumination source power supply 144. Microcontroller 160 may also control other functions and devices. An exemplary microcontroller 160 is a CY8C24223A made by Cypress Semiconductor Corporation, which is a mixed-signal array with on-chip controller devices designed to replace multiple traditional MCU-based system components with one single-chip programmable device. It may include configurable blocks of analog and digital logic, as well as programmable interconnects. Microcontroller 160 may include a predetermined amount of memory 162 for storing data.

The components in reader 112 may be connected by one or more bus 168 or data lines, such as an Inter-IC bus such as an I²C bus, which is a control bus that provides a communications link between integrated circuits in a system. This bus may connect to a host computer in relatively close proximity, on or off the same printed circuit board as used by the imaging device. I²C is a two-wire serial bus with a software-defined protocol and may be used to link such diverse components as the image sensor 154, temperature sensors, voltage level translators, EEPROMs, general-purpose I/O, A/D and D/A converters, CODECs, and microprocessors/microcontrollers.

The functional operation of the host processor 118 involves the performance of a number of related steps, the particulars of which may be determined by or based upon certain parameters stored in memory 166 which may be any one of a number of memory types such as RAM, ROM, EEPROM, etc. In addition some memory functions may be stored in memory 162 provided as part of the microcontroller 160. One of the functions of the host processor 118 may be to decode machine readable symbology provided within the target or captured image. One dimensional symbologies may include very large to ultra-small, Code 128, Interleaved 2 of 5, Codabar, Code 93, Code 11, Code 39, UPC, EAN, and MSI. Stacked 1D symbologies may include PDF, Code 16K and Code 49. 2D symbologies may include Aztec, Datamatrix, Maxicode, and QR-code.

Decoding is a term used to describe the interpretation of a machine readable code contained in an image projected on the image sensor 154. The code has data or information encoded therein. Information respecting various reference decode algorithm is available from various published standards, such as by the International Standards Organization ("ISO").

Operation of the decoding, which may be executed in a user or factory selectable relationship to a scanning routine, may be governed by parameters which are enabled for processing as a part of an autodiscrimination process, whether decoding is to be continuous or discontinuous, etc. Permitted combinations of scanning and decoding parameters together define the scanning-decoding relationships or modes which the reader will use. In the continuous mode (also referred to as continuous scanning mode, continuous streaming mode, streaming mode, fly-by scanning mode, on the fly scanning mode or presentation mode) the reader is held in a stationary manner and targets (such as symbols located on packages) are passed by the reader 112. In the continuous mode, the reader takes continuous image exposures seriatim and continuously decodes or attempts to decode some or all of these images. In the continuous mode exposure times and decoding times may be limited.

Discontinuous mode is a mode wherein scanning and/or decoding stops or is interrupted and initiated with an actuation event, such as pulling of a trigger 115, to restart. An exemplary utilization of the reader in discontinuous mode is via hand held operation. While triggered, the image reader may expose images continuously and decode images continuously. Decoding stops once the image reader is no longer triggered. Exposing of images however, may continue. In the discontinuous mode, the exposure time, decoding time out limits and decoding aggressiveness may be increased more than those set for continuous mode. The discontinuous mode is typically initiated because the operator knows a symbol is present. The decoder therefore may forego making a determination of the presence of a symbol because a symbol is presumed to be in the field of view. Discontinuous mode may provide longer range scanning than the continuous mode.

Switching between continuous and discontinuous modes may be accomplished by use of a trigger 115 located on the reader. For example, when the trigger is depressed by an operator the reader may operate in a discontinuous mode and when the trigger is released the reader may switch to continuous mode after a predetermined period of time. A scanning subroutine may specify an address buffer space or spaces in which scan data is stored and whether scanning is to be continuous or discontinuous.

Another example of switching between continuous and discontinuous modes may be accomplished by symbology wherein switching between the modes depends on the type of symbology detected. The reader may stop attempting to decode a symbol after a predetermined time limit. The reader may limit the type of symbols to decode when in the continuous mode.

In the continuous mode, the present device may be configured to automatically switch to a reduced power state if no symbol has been sensed for a period of time. Upon sensing of a symbol the scanner may then automatically switch back to the higher power state continuous mode. In this reduced power state the scanner may change from having the aimer and/or illumination light sources on for every scan to having either/or on for only some of the scans (e.g. every 2 or 3 or less scans). In this manner the system may still be in a position to sense the presence of a symbol, but will draw less current and also generate less internal heating. After sensing a symbol, the image reader may utilize aiming/illumination for every scan until another period of inactivity is sensed.

Mode changes may be accomplished by the host computer in response to an appropriate signal over either a direct connection or wireless connection to the scanner.

Another example of switching between modes may be accomplished by use of a trigger 115 located on the reader 112. For example, an operator may want to switch a reader's operation between two different modes, such as picture taking vs. data capture or reading only Aztec symbols vs. other symbologies or switching between continuous and discontinuous modes of operation. Switching between modes may be accomplished by detection of quick double-clicks of the trigger 115 and use detection of a quick double-click to toggle the reader in some way between different configurations and/or modes of operation. Additionally, which configuration/mode is active may be signaled back to the operator through a visual indicator (such as an LED) or an audible indicator, such as a beeper tone. The visual indication may be through different colors or patterns of blinking. The audible indicator may indicate through a beeping pattern or tone.

Different reader configurations or modes may be defined via menuing, with the trigger toggling action actually stepping through a sequence of compounded menu commands. Additionally, the time within which two clicks are considered a double-click may be predetermined and adjusted, such as by a menu.

In exemplary configurations considered herein the aimer illumination sources are not operated during the exposure period of the image sensor and therefore the aimers do not necessarily contribute a specular reflection component derived from the ROI. However the aimer in other configurations may also become a source of specular reflection. The aiming pattern generator may be programmed to operate in either continuous or discontinuous modes.

Figure 4:
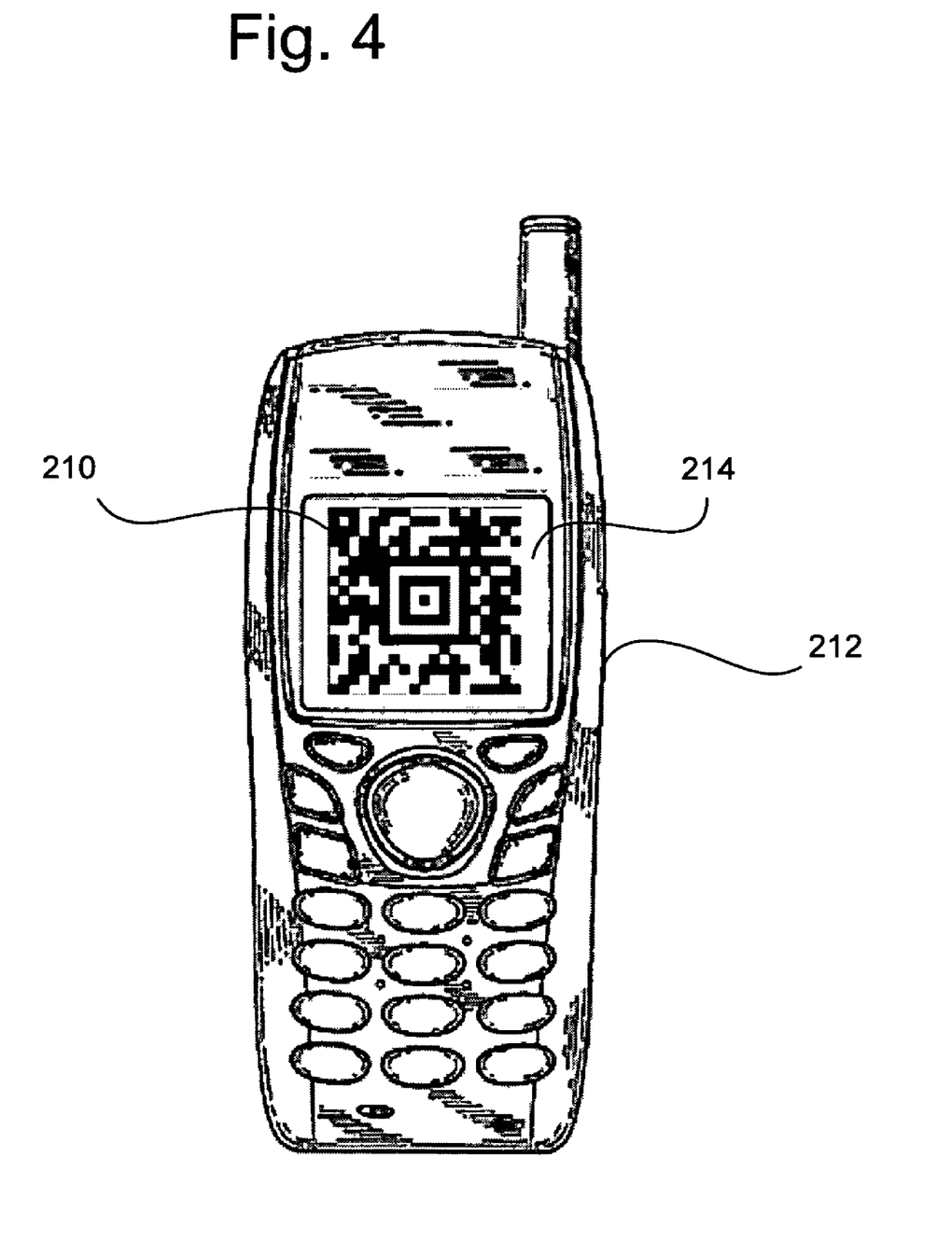
FIG. 4 is an illustration of a mobile phone displaying 2D symbol indicia in accordance with the invention.
Figure 5A:
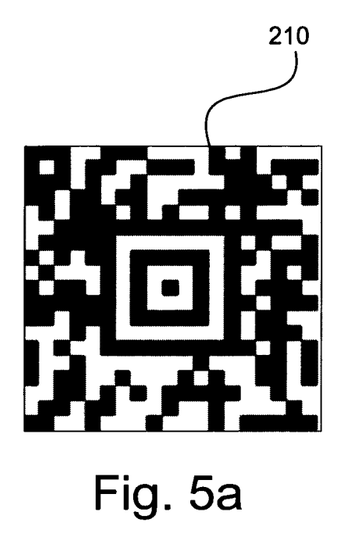
FIGS. 5a-5d is an illustration of a series of exemplary displayed 2D symbol indicia in accordance with the invention.
Figure 5B:
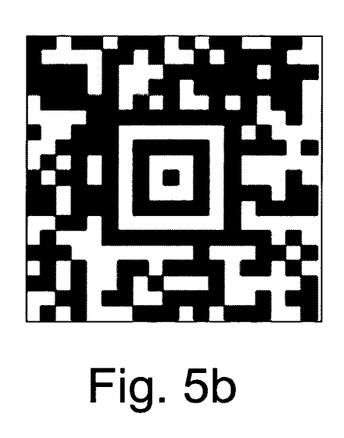
Figure 5C:
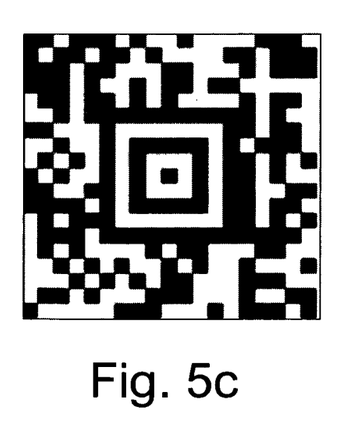
Figure 5D:
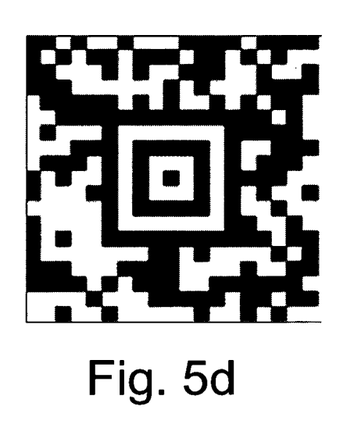

FIG. 4 illustrates an exemplary information bearing indicia (Aztec) 210 displayed on an exemplary display 212, such as may be disposed on a platform 214 such as a mobile phone, portable data terminal (PDT), personal digital assistant (PDA), etc. A Portable Data Terminal, or PDT, is typically an electronic device that is used to enter or retrieve data via wireless transmission (WLAN or WWAN) and may also serve as an indicia reader used in a stores, warehouse, hospital, or in the field to access a database from a remote location. Personal Digital Assistants (PDAs) are handheld devices typically used as a personal organizer, and may have many uses such as calculating, use as a clock and calendar, playing computer games, accessing the Internet, sending and receiving E-mails, use as a radio or stereo, video recording, recording notes, use as an address book, and use as a spreadsheet.

FIGS. 5a-5d illustrate an exemplary sequence of indicia (which may be incorporated into an animated format file) displayed seriatim in a loop on a display for being read and decoded by an indicia reader.

Figure 6:
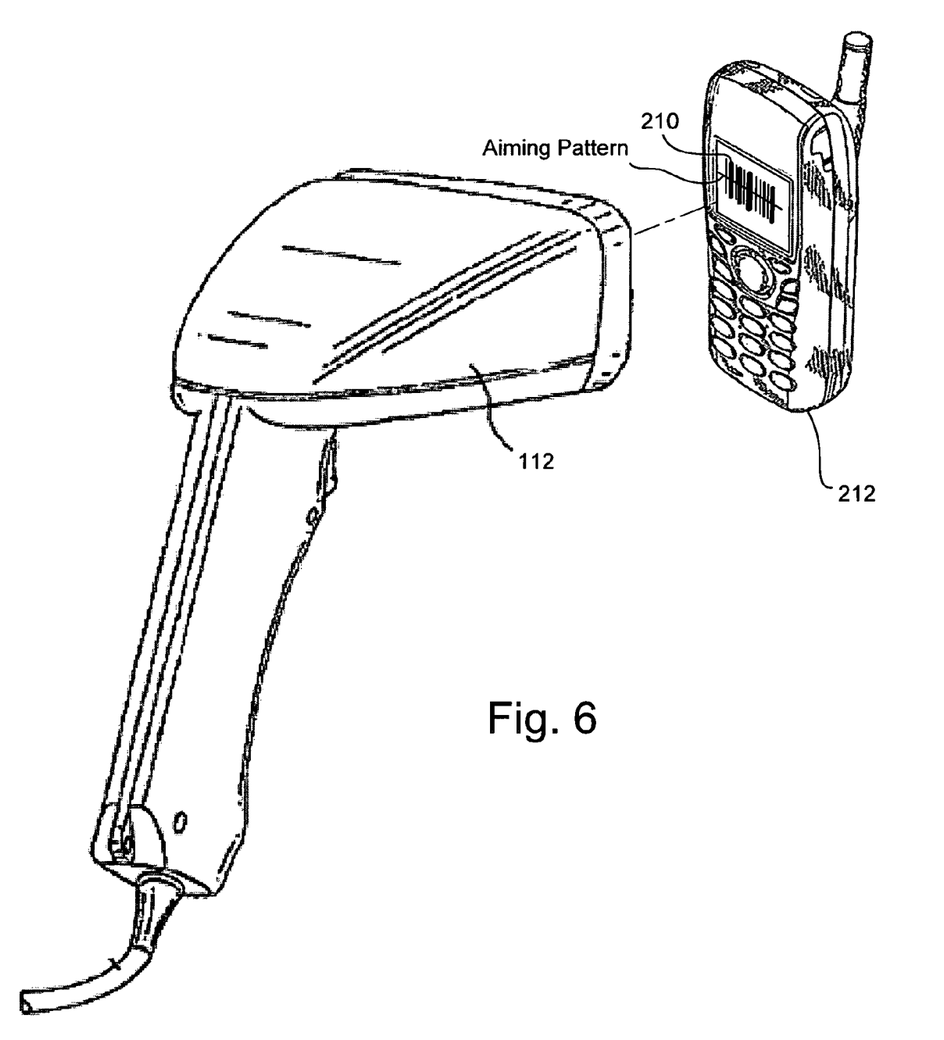
FIG. 6 is a perspective view of an indicia reader directing an aiming pattern on a target.

FIG. 6 is an illustration of an exemplary indicia reader 112 directing an aiming pattern onto and exemplary indicia 210 being displayed on an exemplary platform (mobile phone) 212 which has a display 214.

An exemplary use of an indicia reader is to read indicia displayed on a customer carried platform at a customer point of transaction (POT) in an establishment. A transaction may be any of a number of events that occur between a customer and an establishment, such as a store, ticket counter, etc. The events may involve such things as exchange of monetary funds, payment for merchandise or service, return of merchandise, picking up merchandise that has already been paid for, or contracting for a service (such as leasing or renting).

Figure 7:
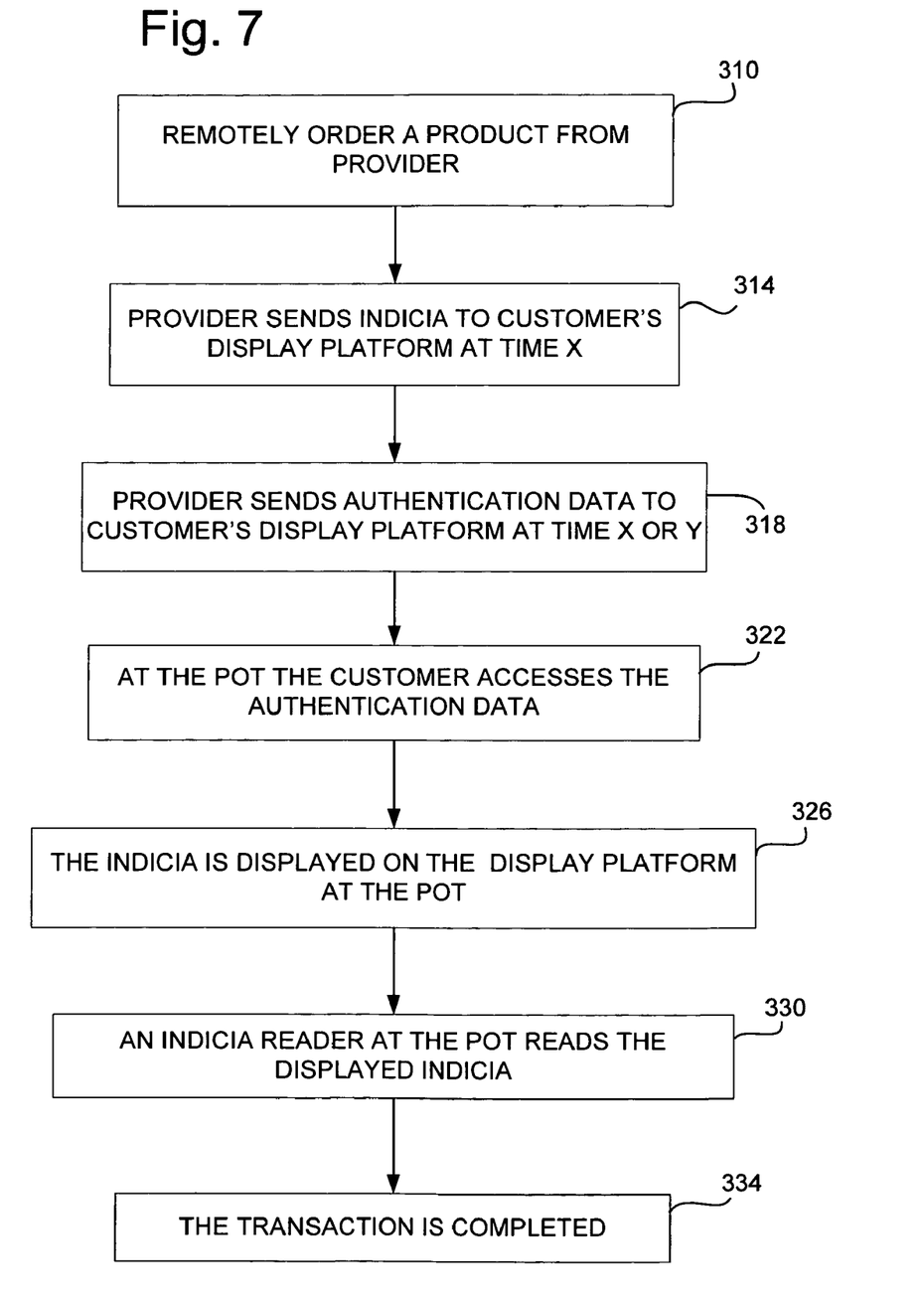
FIG. 7 is an exemplary flowchart for reading indicia and processing the data provided therein.

FIG. 7 is an exemplary flowchart of an indicia reading system, in which a customer remotely places an order for a product, merchandise or a service with a provider in a step 310. In an exemplary system the order is placed utilizing a personal computer configured to be connected to the internet for access to an internet website which facilitates such orders or purchases. Merchandise may such things as a product, a ticket, etc. A service may be such things as a entrance into an establishment, etc. In response to the order being placed, the provider may remotely send an information bearing indicia to the customer in step 314. The indicia may be sent to a platform with a display, a computer, or other device having storage capability. Authentication data may be sent to either the customer or another authorized recipient (such as a financial institution, store or another person) at the same time or a later time in a step 318. The authentication data may be such things as a key code which is to be entered on a keypad, a decryption key, a password, another information bearing indicia, etc. At a POT, a customer may utilize the authentication data in a step 322 to cause or facilitate display in a step 326 the indicia sent in step 314. An indicia reader may scan or read the indicia in a step 330 and the transaction may be completed in a step 334.

The indicia read by the indicia reader may be used as a form of verification or authentication wherein the indicia read might be compared with other data to authenticate the identity of the indicia bearing platform or the bearer of the platform. The platform may have a personalized transaction authentication dataset stored in memory or firmware, which may be disposed as part and parcel of the platform or may be located in a host device or processor.

In an exemplary system, the authentication data sent in step 318 may be sent from the provider as a manual entry (pincode) and the platform would recalculate a new code to be printed as an animated code on the display. The animated barcode may be utilized to prevent unauthorized persons to make a hard copy (duplication) and the animated barcode is isolated to the phone and the person (through his personal identification (PIN) code).

The desired indicia data messages may be encoded into multiple machine readable bar codes using a structured append feature. A structured append feature is information which ends the read data of a symbol which may allow each symbol to be tagged with a "Symbol M of N" indicator, so that a reader can see symbols in any order and reconstruct the original message. Each of those symbols may be realized as a bitmap which are then realized as a frame of an animated Graphics Interchange Format (GIF) image file which is displayed on a display or graphic user interface (GUI) to be read by an indicia reader. The animated GIF may be considered a series or plurality of information bearing indicia displayed seriatim on a display. The indicia reader reads and decodes the plurality of indicia. The duration to show each frame may be adjusted depending on the speed of the reader, and may be for example a 750 ms time frame. The GIF may be set to loop or repeat. In a typical reading operation the reader may be operated in continuous mode to capture each symbol and output the combined message after looping through the displayed images. If the reader misses one or more symbols it may read them on a subsequent loop. Other animation file formats, such as Microsoft Windows Animated Cursor (ANI), FLC, FLI, Multi-image Network Graphics (MNG), Flash (SWF), or other may be utilized.

This operation may be described as time modulation, where synchronization is handled by the structured append mechanism of the machine readable code, and the display is handled by the standard GIF format so that it is accessible to a wide variety of devices with miniature displays. Different types of indicia may be utilized, such as Aztec Code which has a finder pattern in the center of the symbol. If the display surface is shiny such as on a mobile phone for example, the finder pattern may be remote from shiny bezel areas. Aztec Code offers a structured append feature, which allows multiple symbols to be appended in a pre-determined order to communicate a greater number of data bytes. In this application multiple Aztec Code symbols may be combined in an animated GIF or other animation type format file. As the animation plays out, the display is updated with a running loop of multiple Aztec Code symbols shown one after another in a continuous fashion. A reader views the display, and over time it captures all the symbols and outputs the larger data message. In this manner, a greater number of data bytes may be communicated while maintaining ease of reading. GIF files may be displayed on many different types of displays due to its standardized format.

The data message which is output is a "combination" of a plurality decoded information bearing indicia. In other words, a plurality of "related" information bearing indicia are read and decoded. The decoded information is combined by a controller into a comprehensive data message. The controller recognizes the information bearing indicia are related by specific information provide within each of the related indicia.

Other exemplary indicia may be Data Matrix or QR Code. The X-dimension may be chosen to be an integer multiple of display "dots" or "pixels". For example, three by three pixels for each square module in the symbol may be utilized. Larger X-dimensions result in codes that are easier to use, but fewer data bytes may be encoded.

Figure 8:
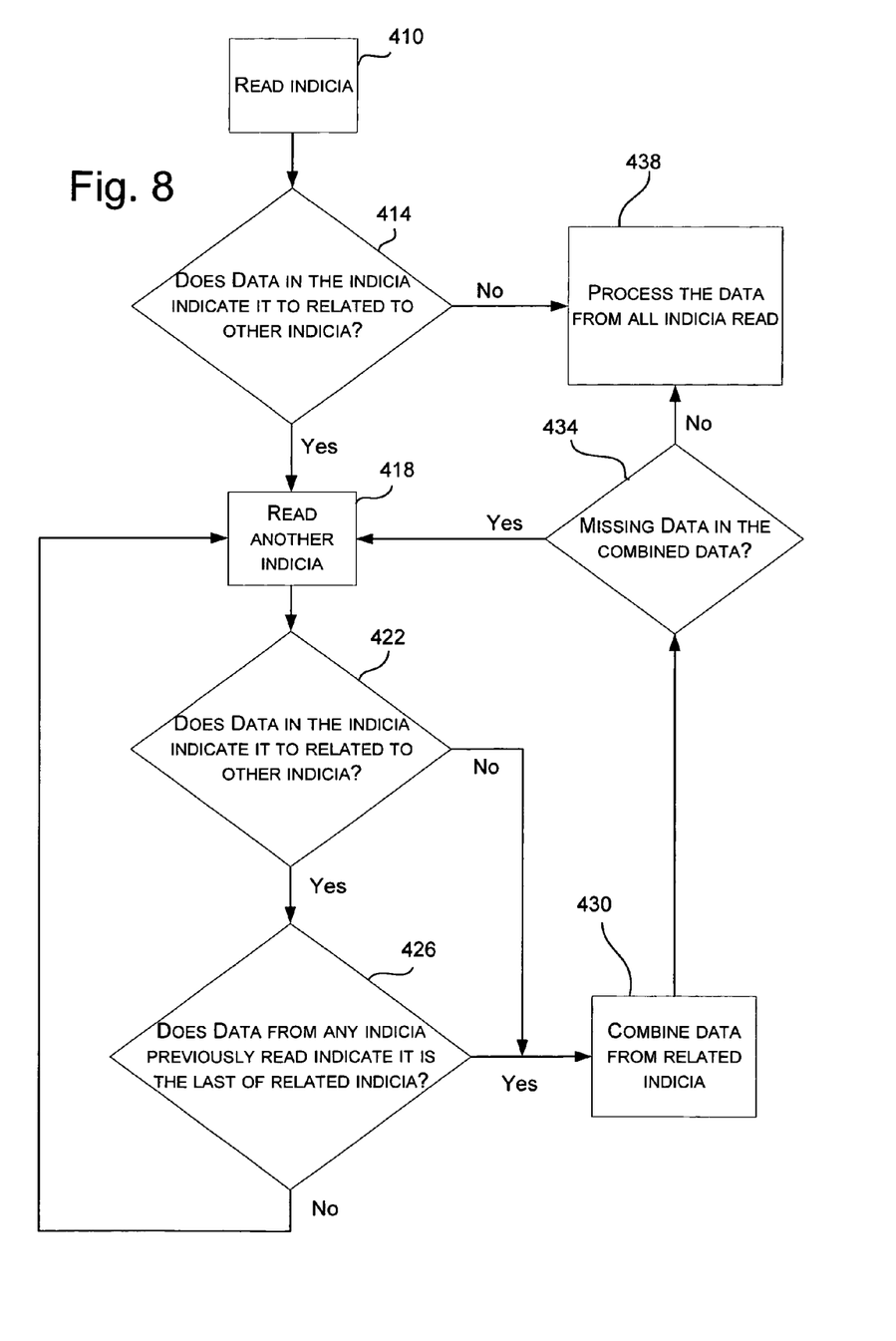
FIG. 8 is an exemplary flowchart for reading indicia and processing the data provided therein.

FIG. 8 illustrates a flowchart of an exemplary indicia reading operation. An indicia is read in a step 410. The data is checked in a step 414 to determine if the data in the indicia indicates if it is related to other indicia. If no, the data from the indicia is processed in a step 438. If yes, then another indicia is read in a step 418. The data recovered from step 418 is then checked in a step 422 to determine if the data in the indicia indicates if it is related to other indicia. If no, then the data from all the read indicia that are related is combined in a step 430. If yes, then a determination is made in a step 426 if the data from the last indicia read indicates it is the last of related indicia. If yes, then the data from all the read indicia that are related is combined. If no, then another indicia is read. After data from all the read indicia that are related is combined, a determination is made in a step 434 if there is missing data from the already combined data. If yes, then another indicia is read. If no, then the data from indicia read is processed further by a controller or host device.

In an example, information bearing indicia may contain sensitive information. For these applications it may be required that the data in the information bearing indicia be encrypted, wherein the information bearing indicia can be read, but the data in the information bearing indicia is encrypted. Encryption is the conversion of data into a form that cannot be easily understood by unauthorized people. A decrypting algorithm would be required to decrypt such data. Decryption is the process of converting encrypted data back into its original form, so it can be understood. Operation of the decrypting algorithm requires the use of a "key". Encryption key(s) may be secret keys, private keys, or public keys. This encryption key may be provided as the authentication data sent from the provider to the customer. Encryption keys may be associated by mathematical derivation, symmetry, or other relationship. For example, an encryption key may derived from a personal identification number (PIN).

Figure 9:
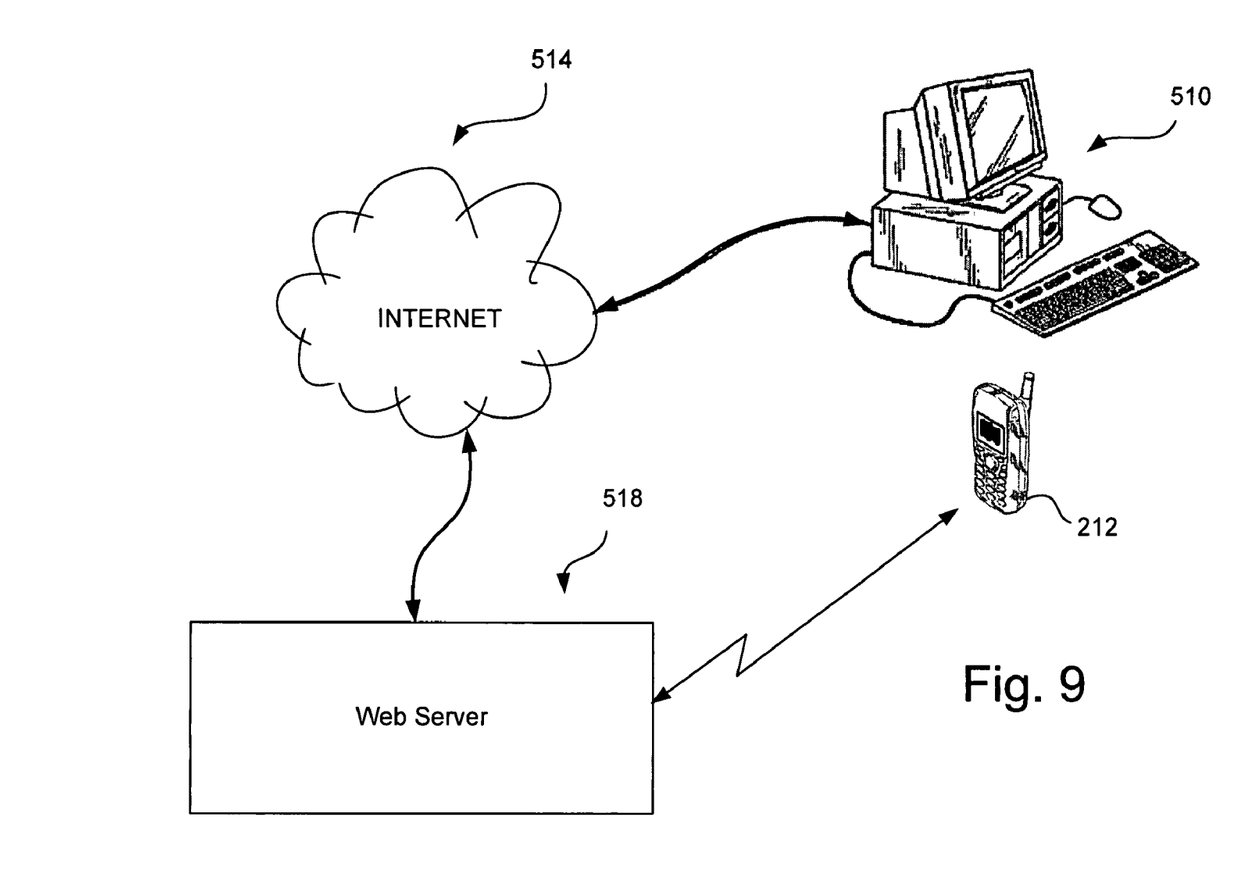
FIG. 9 is block schematic diagram of an exemplary indicia reading system in accordance with the invention.

FIG. 9 illustrates an exemplary transaction system in which a customer utilizes a controller such as a personal computer 510 on the internet 514 to access a web server or controller 518 of a provider to remotely order a product from a provider. The provider sends or communicates an indicia to a display platform 212 such as a mobile phone owned by the customer, the indicia being representative of the product ordered. The provider may also send authentication data to the customer for utilization as an authentication process when the indicia is displayed at a point of transaction (POT). The customer displays the indicia at the POT to an indicia reader which is read by the provider to complete the transaction at the POT in which goods or services are exchanged.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The invention claimed is:

1. A method of completing a transaction comprising the steps of:
   a customer remotely ordering a product from a provider;
   the provider sending a series of information bearing indicia as an animated code to the customer, the indicia being representative of the product ordered;
   the provider sending authentication data to the customer for utilization as an authentication process at a point of transaction (POT) the authentication data being sent as a manual entry pin-code that recalculates a new animated code to be displayed as a new series of information bearing indicia on a display of a customer carried platform at the POT;
   the customer utilizing the authentication data to cause the displaying of the new series of information bearing indicia as the new animated code on the display at the POT; and
   the provider reading the new series of information bearing indicia as a combined message at the POT.

2. A method of reading indicia according to claim 1,
   the reading comprises reading and decoding the new series of information bearing indicia utilizing an indicia reader; and
   the provider establishes a relationship of data provided in the new series of information bearing indicia utilizing a portion of the data provided in each of the new series of information bearing indicia,
   wherein the portion of the data comprises a structured append feature.

3. A method in accordance with claim 1, wherein the display is provided on at least one of the following: a mobile phone; a portable data terminal (PDT) and a personal digital assistant (PDA).

4. A method in accordance with claim 1, wherein reading the new series of information bearing indicia is accomplished with an optical reader.

5. A method in accordance with claim 1, wherein the new series of information bearing indicia is an animation file provided in at least one of the following formats: GIF, ANI, FLC, FLI, MNG, and SWF.

6. A method in accordance with claim 1, wherein each of the series of information bearing indicia are realized as a frame of an animated image file and further comprising the step of adjusting the duration to display each frame.

7. A method of completing a transaction comprising the steps of:
   a customer remotely ordering a product from a provider;
   the provider sending product information to the customer;
   the provider sending authentication data to the customer for utilization as an authentication process at a point of transaction (POT);
   the customer manually entering the authentication data in a display device, the display device then generating an indicia based on the product information and the authentication data;
   the customer displaying the indicia at the POT; and
   the provider reading the indicia at the POT,
   wherein the indicia is a repetitive animated format symbol.

8. A method in accordance with claim 7, wherein the authentication data is a personal identification number (PIN).

9. A method in accordance with claim 7, wherein the authentication data is at least one of the following: a key code; a decryption key; a password; and an information bearing indicia.

* * * * *